US012694241B2

(12) United States Patent
Wimmer et al.

(10) Patent No.: US 12,694,241 B2
(45) Date of Patent: Jul. 28, 2026

(54) MONITORING OF A LOCAL ENVIRONMENT USING A PHYSICAL UNCLONABLE FUNCTION

(71) Applicant: IHP GmbH-Innovations for High Performance Microelectronics/Leibniz-Instit. für innovative Mikroelektronik, Frankfurt (DE)

(72) Inventors: Lara Wimmer, Frankfurt (DE); Eckhard Grass, Frankfurt (DE); Ulrich Rührmair, Frankfurt (DE)

(73) Assignee: IHP GmbH-Innovations for High Performance Microelectronics/Leibniz-Instit. für innovative Mikroelektronik, Frankfurt (DE)

( * ) Notice: Subject to any disclaimer, the term of this patent is extended or adjusted under 35 U.S.C. 154(b) by 281 days.

(21) Appl. No.: 18/477,027

(22) Filed: Sep. 28, 2023

(65) Prior Publication Data
US 2024/0111973 A1 Apr. 4, 2024

(30) Foreign Application Priority Data
Sep. 30, 2022 (EP) .................................... 22199215

(51) Int. Cl.
G06K 7/10 (2006.01)
H04L 9/08 (2006.01)
H04L 9/32 (2006.01)

(52) U.S. Cl.
CPC ........ *G06K 7/10366* (2013.01); *H04L 9/0875* (2013.01); *H04L 9/3278* (2013.01)

(58) Field of Classification Search
CPC .. H04L 9/0875; H04L 9/3278; G06K 7/10366
See application file for complete search history.

(56) References Cited

U.S. PATENT DOCUMENTS 5,790,025 A * 8/1998 Amer ................. G08B 13/1481
250/221
2003/0204743 A1 * 10/2003 Devadas ................. G06F 21/31
257/E23.179
(Continued)

FOREIGN PATENT DOCUMENTS

WO WO-2006130725 A2 * 12/2006 ........... H04L 9/3271

OTHER PUBLICATIONS

Pahlavan et al., "RF Cloud for Cyberspace Intelligence," IEEE Access, vol. 8, May 11, 2020, pp. 89976-89987.
(Continued)

*Primary Examiner* — Yong Hang Jiang
(74) *Attorney, Agent, or Firm* — Sheridan Ross P.C.

(57) ABSTRACT

The invention is directed to a method for assessing a physical unclonable function using a response of a fixed local environment to electromagnetic challenge signals. It comprises providing an electromagnetic challenge signal with a corresponding set of predetermined signal parameters to the local environment being in a reference state, in response to receiving the challenge signal and determining signal data of the received challenge signal, generating and transmitting a modified challenge signal with a respective set of modified signal parameters that depend on the signal data of the received challenge signal, determining the channel impulse response for the challenge signal using the received modified challenge signal; and storing the determined channel impulse response in pairwise association with the respective challenge signal, thereby increasing the unpredictability of the association between the challenge signal and the channel impulse response.

15 Claims, 5 Drawing Sheets

(56) References Cited

U.S. PATENT DOCUMENTS

| | | | |
|---|---|---|---|
| 2007/0036353 A1* | 2/2007 | Reznik .................. | H04L 9/0656 |
| | | | 380/30 |
| 2009/0083833 A1* | 3/2009 | Ziola ..................... | H04L 9/3278 |
| | | | 726/2 |
| 2016/0127357 A1* | 5/2016 | Zibuschka ............ | H04L 9/3278 |
| | | | 726/7 |
| 2023/0058883 A1* | 2/2023 | Iyer ....................... | H04L 9/3278 |

OTHER PUBLICATIONS

Staat et al., "Anti-Tamper Radio: System-Level Tamper Detection for Computing Systems," IEEE Symposium on Security and Privacy (SP), 2022, pp. 1722-1736.
Williams et al., "Augmenting Bit-Level Network Security Using Physical Layer RF-DNA Fingerprinting," IEEE Global Telecommunication Conference (GLOBECOM), Dec. 6, 2010, 6 pages.
Zoli et al., "Estimation of the Secret Key Rate in Wideband Wireless Physical-Layer-Security," IEEE 17th International Symposium on Wireless Communication Systems (ISWCS), Sep. 6, 2021, 6 pages.
Extended European Search Report for Europe Patent Application No. 22199215.9, dated Mar. 15, 2023, 8 pages.

* cited by examiner

R3

R2

R1

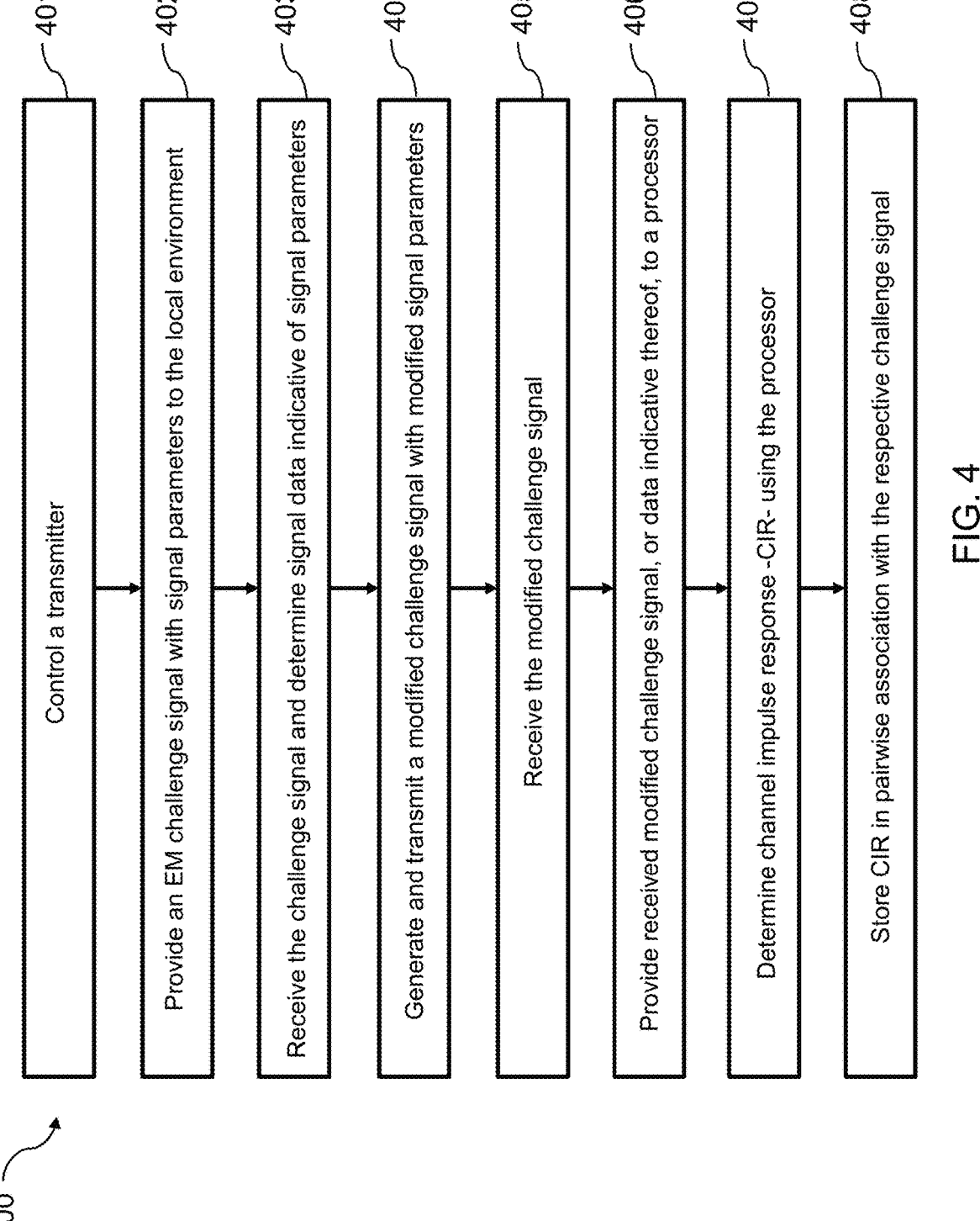

401 Control a transmitter

402 Provide an EM challenge signal with signal parameters to the local environment 403 Receive the challenge signal and determine signal data indicative of signal parameters 404 Generate and transmit a modified challenge signal with modified signal parameters 405 Receive the modified challenge signal 406 Provide received modified challenge signal, or data indicative thereof, to a processor 407 Determine channel impulse response -CIR- using the processor 408 Store CIR in pairwise association with the respective challenge signal

MONITORING OF A LOCAL ENVIRONMENT USING A PHYSICAL UNCLONABLE FUNCTION

CROSS-REFERENCE TO RELATED APPLICATIONS

This application claims the benefit of European Patent Application No. 22199215.9 filed 30 Sep. 2022, the entire contents of which are incorporated herein by reference in its entirety.

FIELD OF THE INVENTION

The present invention is directed to a method for assessing a physical unclonable function. The invention is further directed to a method for monitoring unwanted changes to a local environment, to a local environment monitoring arrangement and to a computer program.

BACKGROUND

The publication Anti-Tamper Radio: System-Level Tamper Detection for Computing Systems, by P. Staat et al., 2022 IEEE Symposium on Security and Privacy (SP), DOI: 10.1109/SP46214.2022.00067 discloses an anti-tamper radio (ATR) system for tamper detection based on the fact that radio wave propagation in an enclosed system of complex geometry is sensitive against adversarial physical manipulation. ATR constantly monitors the wireless signal propagation behaviour within the boundaries of a metal case. Tamper attempts such as insertion of foreign objects will alter the observed radio signal response, subsequently raising an alarm.

Physical unclonable functions (PUF) are basically the imperfections of nature, e.g., the distribution of sand particles, the roughness and thickness variations of a surface, or the structures in the iris of an eye. The probably most famous example of a PUF is the fingerprint, which is already used for security applications for a long time. PUFs are unique and non-reproducible, which are essentially the characteristics of a good security key.

Classical security keys are typically saved locally on a chip and can be read out from the chip by modern analysis methods. If, instead of a locally stored digital key, the inherent characteristics of the device or its local environment are used to generate a security key, the key can be only reproduced by exactly duplicating these characteristics and simulating their response to an incoming stimulus, the so-called "challenge". For these characteristics, the reproduction process as well as the simulation of the response should be prohibitively elaborate, which is a defining feature of a PUF. Thus, a PUF-based security system allows for a secret-free security, which cannot be attacked by reading the chip.

Physical unclonable functions are complex, numerous and diverse, which makes them ideal for security purposes. Each PUF provides a unique response to a challenge, which is an impulse with specific characteristics that interacts with the PUF.

The extremely large number of distinct challenge-response pairs required for security can be reached in two ways:

by precision: the measurement is so accurate and specific, that even small differences can be noticed and used for distinction. Still, the challenge-response pairs have to be reproducible; or by combinatorics: a large number of different challenges is created by combinations of individual "sub-challenges" in such a way, that the responses are non-predictable.

The alteration of the environment causes a change in the response to the wireless signal that propagates through said environment. This response is referred to as a channel impulse response in the frame of this disclosure.

However, there is a drawback in using channel impulse responses in a security context, which is the superposition principle for electromagnetic waves. This principle means that the superposition of two signals, referred to as challenges, $C_1$ and $C_2$, has a predictable response, which is the superposition of the two individual responses: $R(C_1)+R(C_2) =R(C_1+C_2)$. This characteristic drastically reduces the number of non-predictable independent challenge-response pairs if no additional measures are taken. The complexity of a channel impulse response is limited by the number of reflections in the local environment. In an office environment, 2-3 reflections are typical. In an industrial environment, 4-5 reflections are possible due to highly reflective metallic machinery.

It would be beneficial to reduce the predictability of responses in known systems.

According to a first aspect of the present invention, a method for assessing a physical unclonable function using a response of a local environment to electromagnetic challenge signals is disclosed. The method comprises:

a transmitter providing, as a challenge, an electromagnetic challenge signal to the local environment, the challenge signal being provided with a corresponding set of predetermined signal parameters, and the local environment being in a reference state;

a transceiver, in response to receiving the challenge signal and determining signal data of the received challenge signal, generating and transmitting a modified challenge signal with a respective set of modified signal parameters that depend on the signal data of the received challenge signal;

a receiver receiving the modified challenge signal;

a signal processor determining, for association with the challenge signal, a channel impulse response using the received modified challenge signal; and the signal processor storing the determined channel impulse response in pairwise association with the respective challenge signal.

Thus, a challenge is provided in the form of an electromagnetic challenge signal to the environment, which is in a given state, referred to as reference state. The layout of the local environment can be regarded as a physical unclonable function that can be assessed using a suitable challenge signal. The channel impulse response of the local environment, which is shaped by the layout and contents of the local environment, enables an evaluation or assessment of the local environment, in the sense that variations in the environment, or differences in the reference state have a direct and identifiable impact in the channel impulse response.

The challenge signal is provided with signal parameters given by a predetermined set of signal parameters. The electromagnetic challenge signal is then received, at a transceiver, which provides a modified challenge signal with a set of modified signal parameters associated to the challenge signal. This modified challenge signal is received by a receiver and a channel impulse response (i.e. the effect of the local environment in a reference state on the one or more modified challenge signals) is determined and stored in pairwise association with the challenge signal provided in the first step of the method in accordance with the first aspect of the present invention.

By providing the step of generating and transmitting a modified challenge signal with a respective set of modified signal parameters that depend on the signal data of the received challenge signal the problem of the superposition principle can be circumvented since the transceivers may react non-linearly to the received challenge signal. In this regard, it is important to note that the channel impulse response for the challenge signal is herein understood as a function of either time or frequency that is indicative of the response of the local environment to the modified challenge signal. Thus, the method establishes an association between the challenge signal and this particular channel impulse response. The channel impulse response as used herein thus does not correspond to the physical channel impulse response of the channel to the original challenge signal. Thus, by using the modified challenge signal, the predictability of the channel impulse response is reduced.

The method of the invention allows introducing for instance a non-linear response in the generation of the modified challenge signal. This further reduces the predictability of the association between the challenge signal and the channel impulse response.

In the following, embodiments of the method of the first aspect of the invention will be disclosed.

Typically, the challenge signal and the modified challenge signal are provided in a frequency range adapted to the local environment, such that the channel impulse response is reproducible, i.e., the channel impulse response to an identical challenge signal provided at two different points in time is substantially identical, or presents only minor differences within an admissible error range. Typically, the higher the frequency, the more complex is the channel impulse response, which increases the security. However, a high frequency also results in a reduced reproducibility.

In an embodiment, the challenge signal and/or the modified challenge signal are provided as pseudo-noise sequences, such as, but not limited to, m-sequences. The signal data, which is indicative of the received challenge signal, and the channel impulse response, which is indicative of the received modified challenge signal, can be determined, in an embodiment, via autocorrelation.

In an embodiment, the signal parameters of the set of predetermined signal parameters according to which the challenge signals and the modified challenge signals are transmitted include one or more of a transmission power, a transmission frequency, a transmission direction, a directivity, a polarization and a phase, of the challenge signal. The transmission direction is indicative of a direction in which the challenge is provided, and the directivity is indicative of a degree to which the radiation emitted in the challenge signal is concentrated in the transmission direction, i.e., indicative of a region of influence or "size" of the main lobe of the challenge signal.

In an embodiment, the transmission direction is changed using a suitable antenna and/or a suitable antenna array design.

Additionally, or alternatively, the beam direction in any given axis is between 60° and −60°, between 45° and −45°, between 30° and −30°, between 15° and −15° or between 10° and −10°, depending on the antenna and array design. The angle is indicative of the projection of the radiation pattern on a given reference plane containing the transmission direction. Typically, the larger the angle the less directivity and the more complex interaction of the respective challenge (or modified challenge) signal with the local environment.

Additionally or alternatively, the transmission power is selected so that no destructive effects on the devices and or the environment are caused and so that a sufficient signal to noise ratio is detected at the transceiver and at the receiver.

Additionally, or alternatively, the electromagnetic challenge signal is preferably provided as radiofrequency signals and more preferably in the 60 GHz band, which offers a frequency value high enough for achieving a desired complexity and low enough for achieving a desired reproducibility.

In an embodiment, the frequency band used for providing the challenge signal is different from the frequency band used for providing the modified challenge signal.

Additionally, or alternatively, the phase is selected such that the phase steps are larger than the phase jitter or phase noise.

In an embodiment, the signal data is regarded, and determined, as a channel impulse response of the environment to the challenge signal. In other embodiments, the determined signal data is a particular signal parameter or a combination of signal parameters of the received challenge signal.

For example, in an embodiment, the signal data determined corresponds to the signal strength of the received challenge signal and/or the frequency spectrum of the received challenge signal and/or the polarization of the received challenge signal and/or the phase of the received challenge signal and/or the direction of the received challenge signal, and the modified challenge signal is provided with a set of signal parameters, referred to as modified signal parameters, that are associated to the signal data determined. In a particular embodiment, the signal data corresponds to a combination of all the parameters stated above. Preferably the association between signal data and modified signal parameters presents a low correlation, which increases the non-linear hardly predictable relationship between the challenge signal and the modified challenge signal.

In an alternative embodiment, a first channel response is determined for the received challenge signal and a second channel response is determined for the received modified challenge signal.

In another embodiment, the step of receiving the modified challenge signal includes receiving a direct line-of-sight component of the transmitted modified challenge signal and/or receiving a reflected component of the transmitted modified challenge signal. Further, in another embodiment, the step of receiving the modified challenge signal includes receiving a direct line-of-sight component of the transmitted challenge signal and/or receiving a reflected component of the transmitted challenge signal. Thus, the channel impulse response is determined for a combination of up to four components, namely the direct challenge signal, the reflected challenge signal (which in turn may include a plurality of components, each arriving for instance after a different number of reflections within the environment), the direct modified challenge signal and the reflected modified challenge signal (which in turn may also include a plurality of components, each arriving for instance after a different number of reflections within the environment). The significance of each of the components is related to the signal parameters used for the provision of the respective signal (i.e. the challenge signal or the modified challenge signal). In particular, the transmission direction and the directivity, together with the location of the transmitter, transceiver and receiver relative to each other, play an important role in the significance of the line-of-sight (direct) and the reflected (indirect) components of the received signals.

In an embodiment, the method also includes performing a filtering step to filter out a given component or group of components from the overall received signals and determining the channel response using the remaining components, for instance the direct and the indirect modified challenges signal components. A large discrepancy between the data parameters and the modified data parameters is also preferred for increasing the accuracy of the filtering step.

In a particular embodiment, which may comprise any of the technical features described above, the channel impulse response is indicative of the electromagnetic field at the receiver, which is generated by at least the modified challenge signal. The electromagnetic field (e.g. amplitude and/ or phase) can be determined in a time domain or in a frequency domain. The values of the amplitude and/or phase of the electromagnetic field depend on the modified signal parameters according to which the modified challenge signal has been provided.

In an alternative embodiment, the channel impulse response may include signal data of the received modified challenge signal, such as a signal strength, a phase value, a polarization, a direction of reception, or any combination thereof.

In another embodiment, the channel impulse response is indicative of the electromagnetic field at more than one receiver, i.e., is formed by a combination of a plurality of individual channel impulse responses, each determined at a respective receiver. Combination refers to any suitable mathematical operation performed using the individual channel impulse responses, such as addition, multiplication, convolution, etc.

In a particular embodiment, which may also include any of the technical features described above, the step of providing challenges includes transmitting two or more challenge signals simultaneously as a single challenge, and wherein the method comprises determining a single channel impulse response for the two or more challenges signal transmitted simultaneously.

Preferably, in this embodiment, the method comprises generating and transmitting the modified challenge signal with a respective set of modified signal parameters that further depend on the signal parameters of the two or more challenge signals provided simultaneously, thereby enabling an increase of the non-linearity of the channel impulse response with respect to the respective challenge.

In an embodiment, the method further comprises providing parameter data to the transceiver, the parameter data being indicative of the signal parameters of the set of predetermined signal parameters used for providing the challenge. The parameter data thus corresponds to the signal data of the received challenge signal, which is determined by receiving the parameter data rather than by extracting it directly from the received signal using a suitable signal analysis process.

However, in order to increase the security and to reduce the chances of tampering the channel impulse response, the parameter data is preferably not sent and it is extracted directly from the received signals. Preferably, a plurality of challenge signals is provided and the modified challenge signals are provided with modified parameters that depend on the parameter data of all or a subset of the received challenge signals.

According to a second aspect of the invention, a method for monitoring unwanted changes to a local environment is presented, i.e. changes between a reference state and a surveillance state of the local environment. The method for monitoring unwanted changes of the second aspect comprises assessing a by generating pairwise associations of a respective challenge and a corresponding channel impulse response determined by evaluating the received modified challenge signal generated based on the signal data of the challenge signal, e.g. by performing the method of the first aspect. Preferably, a large amount of different pairwise associations are generated using the method of the first aspect of the invention, with the local environment being in a reference state that is fixed, e.g., the distribution of objects within the local environment and/or the shape and state of the walls, floor and ceiling are not altered. Typically, the large number of different pairwise associations generated is still small compared to the overall number of possible challenges and corresponding responses that could be associated.

The method of the second aspect also comprises performing a monitoring step, for identifying changes within the local environment, i.e., changes between a current state, referred to as surveillance state, and the reference state. These changes in the local environment affect the channel impulse response, The monitoring step thus includes:

selecting a set of predetermined signal parameters, and the transmitter providing the corresponding challenge to the local environment, the local environment being in the surveillance state, which may be the same as the reference state or may have been altered with respect to the reference state.

the transceiver, in response to receiving the challenge signal and determining the signal data of the received challenge signal, generating and transmitting the modified challenge signal with the respective set of modified signal parameters that depend on the signal data of the received challenge signal;

the receiver receiving the modified challenge signal;

the signal processor determining the channel impulse response for a given challenge signal using the received modified challenge signal; and the signal processor comparing the determined channel impulse response with that channel impulse response stored during the creation of the physical unclonable function, and upon determining a deviation beyond a predetermined threshold amount between the stored channel impulse response and the currently determined channel impulse response, both associated to an identical challenge, providing a modification signal indicative of a modification of the local environment between the reference state and the surveillance state.

Thus, one of the challenges used for creating a pairwise association when the local environment was in the reference state is chosen and the corresponding electromagnetic challenge signal or challenge signals are provided again to determine the current channel impulse response. The current channel impulse response indicative of the environment in the so-called surveillance state, is determined using the modified challenge signal that has been generated and provided based on the challenge signal selected for performing the monitoring step. This current channel impulse response is compared to the channel impulse response obtained previously (i.e. with the environment in the reference state) and stored to identify possible changes in the channel impulse response that may be indicative of an unwanted modification of the local environment between the reference state and the surveillance state, such a presence of a subject or object that was not present in the reference state, or any other alteration of the local environment.

The provision of the modification signal is therefore indicative of an unwanted change in the local environment, i.e. a discrepancy in the local environment between the reference state and the surveillance state.

The method of the second aspect thus shares the advantages of the method of the first aspect of the invention.

The set of parameters is preferably selected by a controller or processor located outside the local environment and not by the transmitter itself, in order to increase the security of the method.

Preferably, a large number of pairwise associations between the respective challenge and the corresponding channel impulse response are created and stored. Also preferably, a control unit or controller, in particular located outside of the local environment under surveillance and in signal communication with the transmitter and the receiver, and optionally also with the transceiver, selects the challenge to be used during the monitoring step. The signal processor for determining the channel impulse response, or at least the database where the pairwise associations between challenge signals and the corresponding channel impulse responses obtained as a response of the local environment to the modified challenge signal provided in dependence on the (unmodified) challenge signal are stored, is also preferable located outside the local environment. In an embodiment, the controller and the signal processor are integrated in a single device. Also preferable, and in order to increase the security, the database comprising the pairwise associations used for determining the occurrence of an unwanted change is an external database located outside of the local environment, preferably also integrated with the signal processor and/or the controller, or connected to it via a wired or wireless connection.

A third aspect of the present invention is formed by a local environment monitoring arrangement, that is suitable for performing the method for assessing a physical unclonable function of the first aspect and also for performing the method for monitoring unwanted changes to a local environment of the second aspect of the invention one or more transmitters configured to provide as a challenge, one or more electromagnetic challenge signals to the local environment, the challenge signals having a corresponding set of predetermined signal parameters, and the local environment being in a reference state or a surveillance state, which induces a channel impulse response to be determined for the given challenge signal;

one or more transceivers configured to, in response to a reception of the challenge signal, to determine signal data of the received challenge signal, and to generate and transmit a modified challenge signal with a respective set of modified signal parameters that depend on the signal data of the received challenge signal;

one or more receivers configured to receive the modified challenge signal;

a signal processor connected at least to the one or more transmitters and to the one or more receivers and configured:

to determine the channel impulse response for the challenge signal using the received modified challenge signal to store the determined channel impulse responses response in pairwise association with the respective challenge signal;

to compare a currently determined channel impulse response with that channel impulse response stored, both obtained using an identical challenge; and upon determining a deviation beyond a predetermined threshold amount between the stored channel impulse response and the currently determined channel impulse response, both associated to an identical challenge, to provide a modification signal indicative of a modification of the local environment between the reference state and the surveillance state.

Thus, the local environment monitoring arrangement of the third aspect shares the advantages of the method of the second aspect and is advantageously configured to monitor occurrences of unwanted changes in the local environment.

In the following, embodiments of the arrangement of the third aspect of the invention will be described.

In an embodiment, the one or more transmitters and/or the one or more receivers are transceivers having both a transmitting unit and a receiving unit and can be configured to act as any of a transmitter, a transceiver or a receiver for performing the steps of the methods of the first and the second aspect.

In a preferred embodiment, one or more transmitters and/or the one or more transceivers comprise an antenna array for providing the challenge signals and/or the modified challenge signals with a predetermined and variable transmission direction and/or a predetermined and variable directivity. Additionally, or alternatively, one or more of the transceivers and/or or more of the receivers comprise an antenna array for receiving the challenge signals and/or the modified challenge signals, and to extract, infer or otherwise ascertain signal data indicative of a direction of reception, which can be additionally or alternatively used for determining the channel impulse response and/or the modified signal parameters. Thus, signal data associated to the direction from which the signal is received can be also used to determine the modified signal parameters and/or the channel impulse response.

Depending on the local environment, in particular on the reflectivity of the walls, a wireless signal such as the challenge signal can be reflected several times (e.g. up to 5 times) before the signal to noise ratio is reduced sufficiently to avoid a significant detection. Each reflection increases the entropy of the channel response and improves the safety of system. There is a trade-off between the entropy and the reproducibility of the channel impulse responses, which decreases with the number of reflections. This effect can be illustrated by a billiard board, where the trajectory becomes chaotic after a few reflections. A large number of reflections is preferred in the local environment monitoring arrangement to increase the security of the local environment.

In order to achieve a large number of reflections, a highly reflective environment is required, but the entropy and the diversity of the channel impulse responses also depends on the room geometry. In a very simple room geometry, e.g., a cube, the responses of very similar challenges are predictable at least for the first few reflections. An example would be two challenges that are different only in the transmission angle and the angles only differ by a few degree. A cubic room would be easy to measure by a few measurements and thus easy to crack for an attacker.

Thus, in another embodiment, the local environment monitoring arrangement further includes one or more passive reflectors having a structured reflective surface. The one or more passive reflectors arranged within the local environment are arranged and configured to reflect at least the modified challenge signal provided by the transceiver. In another embodiment, the challenge signal provided by the transmitter can also be reflected by the passive reflectors.

Preferably the walls should have the most complex reflection characteristics possible in order to create unpredictable responses. This can be seen a little similar to a dazzle camouflage of the ships in World War I, where the painted pattern hides the geometry of the object. Thus, in an embodiment the highly reflective passive reflectors comprise structures, preferably in the size of the wavelength of the modified challenge signal in order to induce irregular reflections. Preferably, each of the one or more passive reflectors have a structured reflective surface having a linear structure, a circular structure, or a helical structure such as, for instance blazed gratings, Fresnel-lens like structure or spiral phase plates. In general, these meta-structures manipulate phase and amplitude of the reflected wave of the signal. In another embodiment, one or more of the passive reflectors include a random structure.

Preferably, the size of the passive reflectors should exceed the spot size of the pencil beam of the challenge signal or the modified challenge signal in order to facilitate reproducible channel impulse responses. Thus, in an embodiment, an area of the passive reflector is larger than an impinge-area of the modified challenge signal on the passive reflector. The impinge area is an area onto which a significant portion of the total energy of the electromagnetic signal, such as for instance 50%, 60%, 70%, 80% or 90% of total energy is directed and depends on the relative position of the transmitter/transceiver and the receiver and on the directivity and the transmission direction of the challenge signal or the modified challenge signal.

For enhanced security, the position of transmitter, transceivers and receivers, and optionally also of the passive reflectors can be changed regularly in order to provide new sets of challenges and responses. Another option for enhance security is to reprogram the response of the active targets, i.e., the association between the signal data and the modified signal parameters.

A fourth aspect of the present invention is formed by a computer program comprising instructions that, when executed by a processor, in particular a processor of a local environment monitoring arrangement, cause the processor to carry out the method for assessing a physical unclonable function using a response of a local environment to electromagnetic challenge signals of the first aspect or the method for monitoring unwanted changes to a local environment of the second aspect.

It shall be understood that the method for assessing a physical unclonable function of claim 1, the method for monitoring unwanted changes to a local environment of claim 8, the local environment monitoring arrangement of claim 9, and the computer program of claim 15, have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

BRIEF DESCRIPTION OF THE DRAWINGS

In the following drawings:

FIG. 4 shows a flow diagram of a method for assessing a physical unclonable function in accordance with the invention.

DETAILED DESCRIPTION OF EMBODIMENTS

Figure 1:
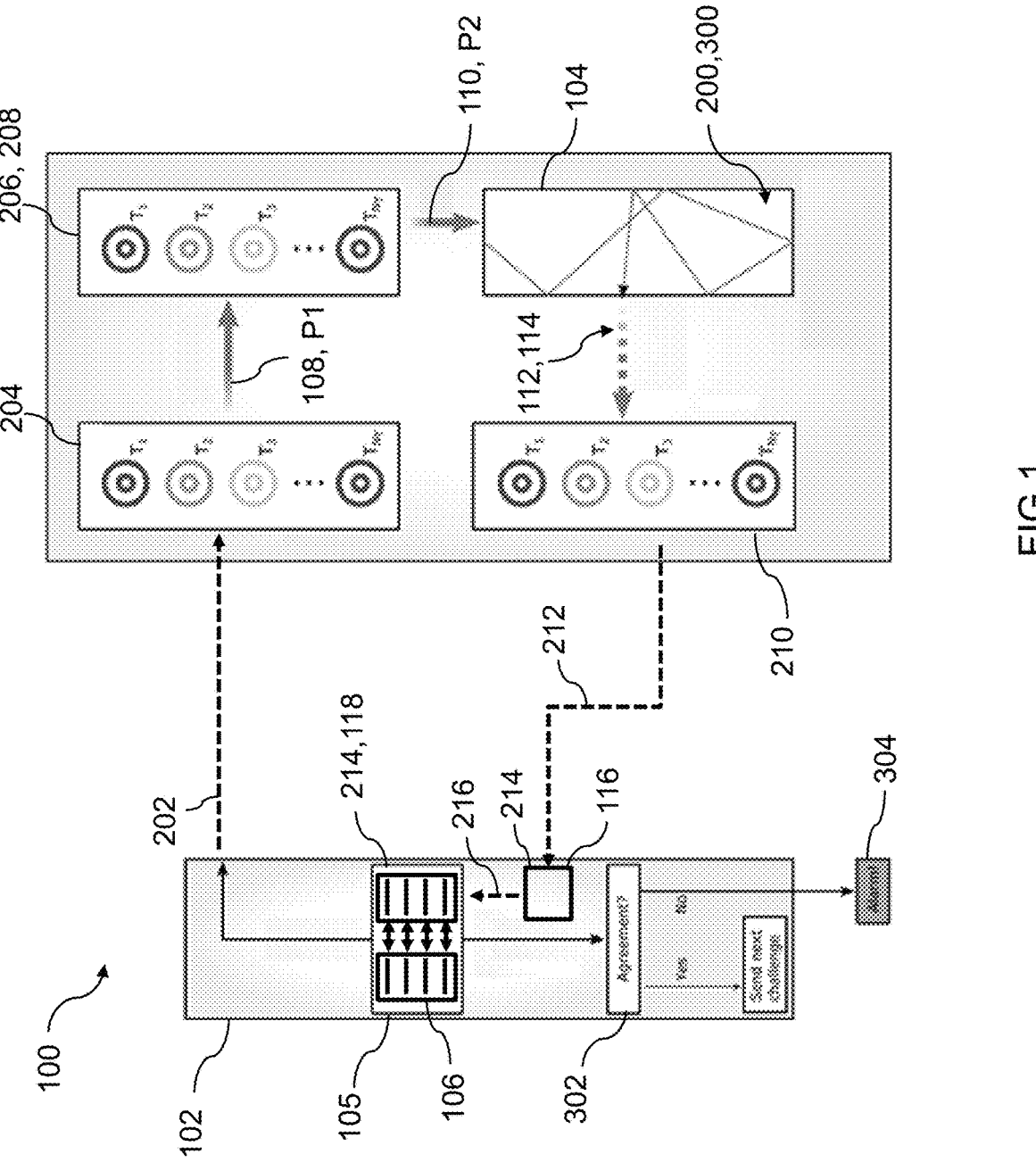
FIG. 1 shows a schematic diagram of a local environment monitoring arrangement according to an embodiment of the invention in which a method for assessing a physical unclonable function and a method for monitoring unwanted changes to a local environment, both according to the invention, can be performed.

FIG. 1 shows a schematic diagram of a local environment monitoring arrangement 100 according to an embodiment of the invention in which a method for assessing a physical unclonable function 200 according to the invention and a method for monitoring unwanted changes to a local environment 300, also according to the invention, can be performed.

The local environment monitoring arrangement 100, also referred to as the arrangement, comprises a remote computer or processor 102 and a plurality of signal-providing devices $T_1, T_2, T_3, \ldots, T_{NT}$. Although some of the signal-providing devices may only act as transmitters or receivers, they will be considered as transceivers having both a transmitting and receiving functionality for the sake of clarity. Those signal-providing devices that have both receiving and transmitting functionality and to which a challenge signal is sent, are referred to as active targets. The active targets are arranged in a room 104 to be monitored. The room 104 forms a local environment under surveillance.

The processor 102 comprises, or in general has access to, a database 105 where one or more sets of predetermined signal parameters 106 are stored. For performing the method for assessing a physical unclonable function, such as the room 200, the processor 102 selects a particular set of signal parameters S1 and instructs or controls 202 a transceiver, e.g. one of the devices, T1, T2, etc., to provide 204, as a challenge, i.e., an electromagnetic challenge signal 108 to the local environment 104, the challenge signal being provided with, and thereby characterized by, a corresponding set of predetermined signal parameters P1, and the local environment being in a reference state, which induces a channel impulse response to be determined for the given challenge signal. The challenge signal is received 206 by another device T1, T2, etc., acting as an active target, i.e. a signal-providing device acting as a transceiver (receiver and transmitter) for said challenge signal. This active target, in response to receiving the challenge signal 108 is configured to determine signal data of the received challenge signal 108, and to generate and transmit 208 a modified challenge signal 110 with a respective set of modified signal parameters P2 that depend on the signal data of the received challenge signal 108. The challenge signal 108 preferably arrives at the active target after having interacted with the room geometry, i.e. is not provided as a line-of-sight signal from the transmitter to the transceiver (active target), but includes a significant reflected component. The modified challenge signal 110 is provided to the local environment and is received 210 by another active target, which may also be the active target that provided the challenge signal 108.

The modified challenge signal 110 is reflected on the walls (possibly including floor and ceiling) and on the objects located in the local environment 104 so that the active target receives a line-of-sight component 112 and a reflected component 114 of the modified challenge signal 110. The received signal or relevant information pertaining thereto is provided 212 to the processor 102 or to a signal processor 116 connected to the processor 102 or being an integral part thereof, which is then configured to determine 214 the channel impulse response 118 for the challenge signal 108 using the received modified challenge signal 112, 114. The signal processor 116 is further configured to store 216 the determined channel impulse response 118 in pairwise association with the respective challenge signal.

Once one or more, preferably a large number, of pairwise associations of challenges and corresponding responses have been determined and stored in the database 105, wherein the associations have been obtained with the local environment 104 being in a reference state, the arrangement 100 can be used for performing the method 300 monitoring unwanted changes to a local environment, i.e., to determine unwanted modifications within the local environment that put said local environment in a state that is different from the reference state. The method 300 includes selecting one of the set of data parameters, e.g., P1, to generate a challenge signal 108 for which a channel impulse response 118 has already been determined and stored (via the modified challenge signal), obtaining a current channel impulse response for the current modified challenge signal, and comparing 302 the previously stored channel impulse response with the currently determined channel impulse response to detect any changes that might be indicative of a modification of the local environment between the reference state and a current surveillance state. If both channel impulse responses agree within a predetermined agreement range, the processor considers that the current surveillance state is identical to the reference state and that no modification of the local environment has taken place. The method 300 may be performed once again choosing another (or the same) set of signal parameters for providing another challenge. If, however, a discrepancy between the stored channel impulse response and the current channel impulse response is detected (a discrepancy above a predetermined relevant threshold), the processor is configured to provide a modification signal. Thus, upon determining a deviation beyond a predetermined threshold amount between the stored channel impulse response and the currently determined channel impulse response, both associated to an identical challenge, the method 300 comprises providing 304 a modification signal indicative of a modification of the local environment between the reference state and the surveillance state. The modification signal is, in the particular example of FIG. 1, an alarm signal.

The arrangement can be used, for instance, for monitoring a museum room where a valuable piece of art is exposed. A precious object, which is in this exemplary scenario the world-famous da Vinci painting of the Mona-Lisa, should be protected from theft and harm. The painting is in an environment without any moving objects, which would be the empty museum room at night. If anything changes in this scenario, the security system should give an alarm. In order to do so, the security system has to react most sensitively to changes in the environment.

Figure 2:
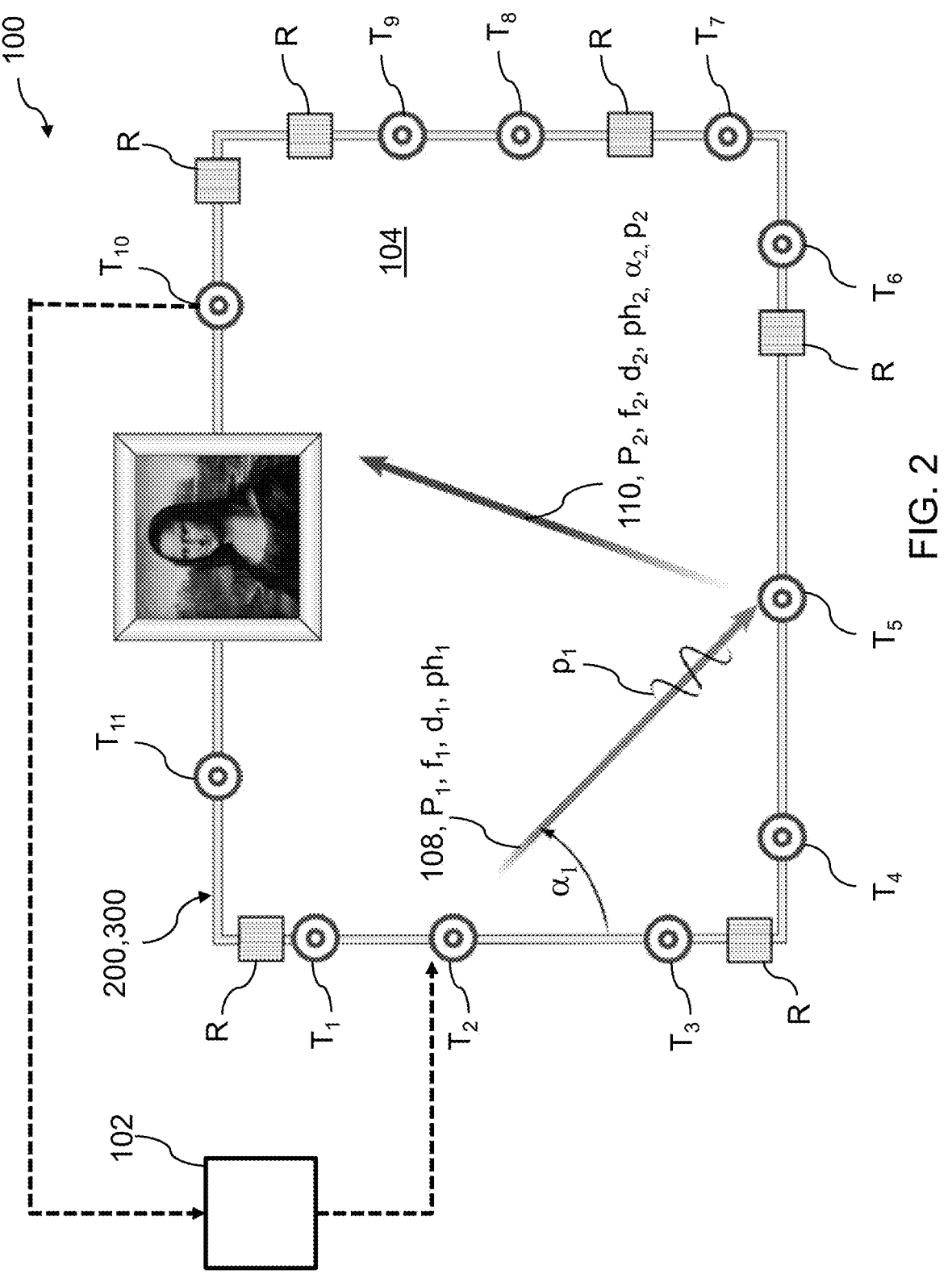
FIG. 2 shows a local environment monitoring arrangement according to another embodiment of the invention for monitoring a museum room.

This security concept is displayed as an exemplary diagram in FIG. 2 with further reference to the arrangement and the methods described in FIG. 1. Those technical features having an identical or similar functionality will be referred to using the same reference numbers.

The security system, or arrangement 100, comprises a remote computer 102 and the signal-providing devices (e.g. transceivers $T_1$-$T_{11}$) in a museum room, which is the local environment 104 to be monitored, i.e. the physical unclonable function. The remote computer 102 comprises or has access to a database 105 of previously measured challenge-response pairs (see FIG. 1). From this database 105, a challenge is picked randomly. A challenge is defined by the signal parameters that are used to provide the challenge signal 108. In an arrangement with a plurality of transmitters for transmitting a challenge signal, the challenge is additionally defined by the transmitter or transmitters providing the challenge, so that a challenge provided by a first transmitter with a given set of signal parameter is different from a challenge provided by a second transmitter different from the first transmitter even if the challenge signals are provided with the same set of signal parameters. The signal parameters according to which the challenge signal is provided comprises specific information about the challenge signal 108, which includes one or more of the transmission power $P_1$, the transmission frequency $f_1$, the transmission direction $\alpha_1$, the directivity $d_1$, defined as a measure of the degree to which the radiation emitted is concentrated in the transmission direction, the polarization $p_1$, and the phase $ph_1$ of the challenge signal 108, in this example transmitted by the active target $T_2$. The challenge signal is received and evaluated in this particular example by the active target T5, which in response to receiving the challenge signal is configured to determine signal data of the received challenge signal 108, and to generate and transmit the modified challenge signal 110 with the respective set of modified signal parameters $P_2$, $f_2$, $\alpha_2$, $d_2$, $ph_2$ that depend on the signal data of the received challenge signal 108. Some of the modified signal parameters may have the same value as the signal parameters used to provide the challenge signal. The signal data is regarded, and determined, in some exemplary arrangements as a channel impulse response of the environment to the challenge signal. In other arrangements, the determined signal data is a particular signal parameter or a combination of signal parameters of the received challenge signal. For example, in an arrangement, the signal data determined corresponds to the signal strength of the received challenge and/or the frequency spectrum of the received challenge and/or the polarization of the received challenge, and the modified challenge signal is provided with a set of signal parameters that are associated to the signal data determined. Preferably, the association between signal data and modified signal parameters presents a low correlation, which increases the non-linear hardly predictable relationship between the challenge signal and the received modified challenge signal.

Preferably, the parameter values for the transmission power $P_1$ and transmission direction $\alpha_1$ are discrete in order to facilitate the reproducibility of the final channel impulse response. Polarization and phase offer each two linearly independent values. The spectral characteristics, i.e., bandwidth and centre frequency, of a challenge signal are preferably. Preferably, to increase the security of the arrangement by increasing the complexity of the channel impulse response, a respective set of signal parameters is given to a plurality, or even to each of the active targets in the museum room 104. The complete challenge can be written as:

$$C = [T_1, T_2, \ldots, T_{NT}],$$

with each individual challenge signal provided with a respective set of signal parameters The active targets preferably include 2D antenna arrays that are capable of beamforming, i.e., can provide up to two beamsteering angles e.g. an azimuth and an elevation angle. From each of the transmitters, a pencil beam characterized by one or more of power, frequency, angle, directivity polarization, and phase is sent to another signal providing device acting as a transceiver, or in other words, an active target. In the case of FIG. 2, the challenge signal 108 is sent from signal-providing device $T_2$ to active target $T_5$, where the active target $T_5$ is configured to react nonlinearly to the incident challenge signal 108. Their reaction is determined by the challenge itself. This nonlinear response is the concept to circumvent the superposition principle as elucidated below.

Active targets have the beneficial side effect that they can work as amplifiers and increase the number possible reflections, which increases the entropy of the individual channel impulse responses, in particular when the responses to the originally provided challenge signal are considered as part of the overall channel impulse response.

From the active targets receiving the challenge signal 108 (e.g. $T_5$ in FIG. 2), a modified challenge signal 110 is sent into the museum room 104 to evaluate a channel impulse response. From the overall resulting channel impulse response, evaluated either in the time domain or in the frequency domain, many different parameters can be extracted, which include the received power of the modified challenge signal, the angle of the received signal a, the polarization of the received signal, the phase of the received signal. The spectral characteristics in the frequency domain are equivalent to the time-dependent power decay profile.

The response to each challenge comprises, in an example, the time-resolved received signal from one or more active targets receiving the modified challenge signal 110. If this response is in agreement with the predetermined response saved in the database as a result of performing the method 200, the room 104 is considered to unaltered and a next challenge is sent. If the received channel impulse response is in disagreement with the channel impulse response from the database, the room is considered to have been tampered and an alarm signal is issued. The reproducibility of the channel impulse responses is crucial to prevent false alarm. Thus, for example, it does not necessary to focus on precision measurement in the millimetre range since any vibration, for instance by a large vehicle driving by, or by a large object falling in a nearby room trigger a false alarm.

Preferably the channel impulse response is indicative of the electromagnetic field at more than one receiver, i.e., is formed by a combination of a plurality of individual channel impulse responses, each determined at a respective receiver. Combination refers to any mathematical operation performed using the individual channel impulse responses such as addition, weighted addition, multiplication, arithmetic mean, or any other suitable mathematical operation. Additionally, the combined channel impulse response can be provided all together as a vector that includes, at each position, the channel impulse response of a respective receiver, and using a number associated to a corresponding receiver as an index of said vector.

Figures 3A, 3B, 3C:
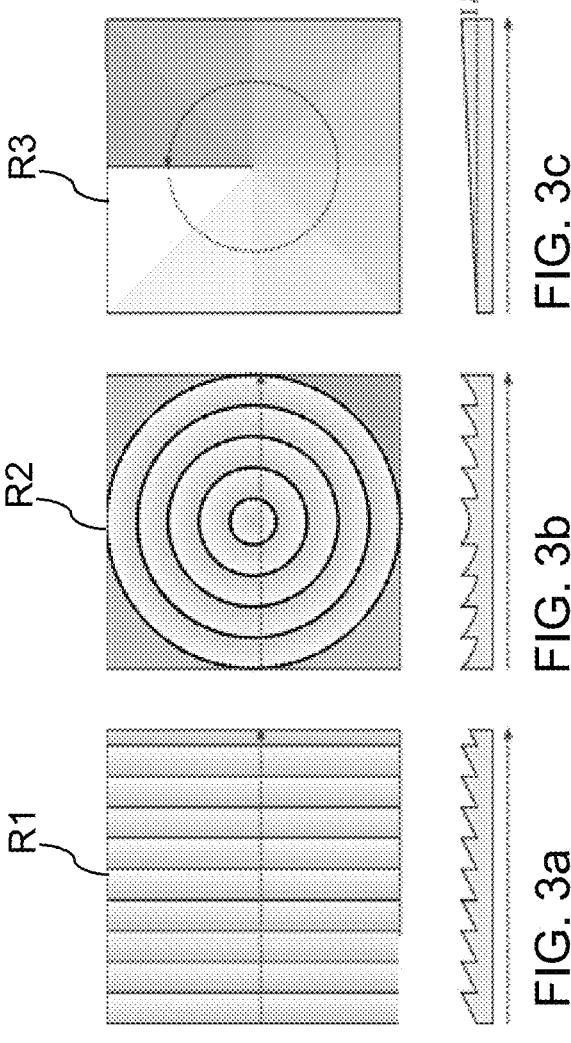
FIG. 3$a$-$c$ show different exemplary passive reflectors that can be implemented in an arrangement in accordance with an embodiment of the invention.

The complexity of the channel impulse response may be further increased by providing modifications of the wall structure: For example, the walls can be covered by highly reflective tiles acting as passive reflectors R. The specific purposes and the characteristics of these passive reflectors R are described below in detail with reference to FIGS. 3a-c, which show three exemplary passive reflectors that can be implemented in an arrangement 100. Thus, it is preferred that the walls of the local environment provide a complex reflection behavior in order to create unpredictable channel impulse responses. In cases where the walls alone do not provide the desired complexity, this can be achieved by the addition of the passive reflectors. However, even in the case that the walls alone provide the desired complexity, this can be further increased by the addition of suitable passive reflectors. In the arrangement 100 of FIG. 2 the walls include as passive reflectors R, highly reflective tiles with structures in the size of the wavelength $\lambda$ of the modified challenge signal 110 or of the challenge signal 108, as depicted in FIGS. 3a-c, in order to induce irregular reflection. Examples of passive reflectors are reflectors R1 with blazed gratings (FIG. 3a), reflectors R2 with Fresnel-lens like structure (FIG. 3b) or reflectors R3 spiral phase plates (FIG. 3c). In general, these meta-structures alter both the phase and the amplitude of the reflected wave.

It is preferred that the size of the passive reflectors R exceed the spot size of the pencil beam of the modified challenge signal 110 to facilitate reproducible channel impulse responses. For enhanced security, the position of the passive reflectors and of the active targets could be changed regularly in order to provide a new set of challenges and responses. Another option includes reprogramming the response of the active targets, i.e., change the association between the signal data pertaining to the received challenge signal and the modified signal parameters used for providing the modified challenge signal.

With active targets T, the superposition principle can be circumvented by a suitable non-linear association of challenge signal and modified challenge signal and the passive reflectors with a suitable surface structure guarantee diverse channel impulse responses with a high entropy. It is crucial for a security system, that the number of different challenges is so large, that the challenges are not repeated and only a subset of all possible challenges is employed for security purposes. The number of possible challenge-response pairs $N_{CR}$ can be estimated from the number of discrete transmission power levels np, the number of discrete angles $n_\alpha$, the number of transmitters $N_T$ and the two linearly independent polarization states and phases:

$$N_{CR} = \left(n_P^2 \cdot n_\alpha\right)^{2N_T}$$

The "2" in the first exponent stands for the two phases and the "2" in the last exponent stands for the two polarization states. The two phases are linearly independent, if sent in the same direction. For different angles, I and Q cannot be separated. The polarization states can be seen as two completely independent transmitters and thus, the exponent refers to the complete combination of angles and power levels.

The number of reproducible responses depends on the number of primary transmitters, i.e., transmitter that provide the challenge signal.

The challenge should consist of discrete values for each signal parameter in order to facilitate clearly distinct responses that are easy to reproduce and to process.

One might ask the question, why the following setup is not a good idea, although it seems so simple and effective: One transmitter broadcast covers the complete room. A single receiver detects the channel impulse response and reacts with an alarm to changes of the channel impulse response. This setup is relatively similar to a motion-sensor. In contrast to the PUF-based system disclosed herein, this setup does not need an evaluation of the responses to individual challenges but reacts only to changes in the channel impulse response.

In order to hack this simple system, there are at least two options:

Read-out of the permanent channel impulse response from the chip, which has to be stored locally for comparison (side-channel attack). Subsequently reproduction of that channel impulse response, which is not so trivial.

Manipulation of the chip to make sure it continues to send an "everything is ok" signal back to the police or the chips are exchanged, once the "ok" signal is known.

These two attacks are surely not the only ones possible. Obviously, these two types of attacks are not possible for a PUF-based security system.

The superposition principle is an inherent characteristic of electromagnetic waves and there is no possible way to change that fundamental principle. However, there are tricks to apply that the simple equation $R(C_1)+R(C_2)=R(C_1+C_2)$ is not valid anymore. This is required for an increase of security in the arrangement.

A first intuitive approach might be to take a nonlinear propagation medium. This approach has obvious flaws:

it is not so easy to fill an empty museum room with a nonlinear medium in a healthy way;

a nonlinear channel impulse response can be predictable, once the nonlinear coefficient of the propagation medium is determined;

as a condition for the nonlinear effect to come into play, the two beams of the two challenges have to overlap in space and time. Considering two beams with 2-3 reflections, this is a relatively strong condition; and nonlinear effects typically appear at high intensities—a condition, that is usually not fulfilled for a radio transmission system.

In the present disclosure, the "active targets" are used to circumvent the superposition principle. Active targets are transceivers that react nonlinearly to an incoming signal as mentioned above in the discussion of FIGS. 1 and 2.

The importance of the nonlinear response is illustrated in the following two examples:

In the simplest example, the transceiver changes the transmission power P of the modified compared to that of the challenge, e.g. $P(C_2)=2P(C_1)$. In case of a simple reflection, the challenge becomes predictable just after one measurement. In order to be unpredictable, the active target has to react nonlinearly to the incoming wave. The nonlinearity can be for example in the transmission power, the direction, the directivity, the polarization, and the phase of re-transmitted signal (the modified challenge signal) of the active target.

Considering a challenge $C_3$ consisting of two different "sub-challenges" $C_1$ and $C_2$ aiming for two different targets. The nonlinear response of the active targets (i.e. the modified challenge signal) preferably depends on the complete challenge signal.

If the nonlinear response function linking the signal data to the set of modified signal parameters of the active targets is hacked, the channels are still unpredictable due to the physical unclonable characteristics of the room.

FIG. 4 shows a flow diagram of a method 400 for assessing a physical unclonable function in accordance with the invention.

The method comprises, in a step 401, controlling a transmitter or transceiver for providing, in a step 402, as a challenge, an electromagnetic (EM) challenge signal to the local environment, the challenge signal being provided with a corresponding set of predetermined signal parameters, and the local environment being in a reference state, which induces a channel impulse response to be determined for the given challenge signal. The method further comprises, in response to receiving the challenge signal, and determining signal data of the received challenge signal in a step 403, generating and transmitting, in a step 404, a modified challenge signal with a respective set of modified signal parameters that depend on the signal data of the received challenge signal. The method also comprises, in a step 405, receiving the modified challenge signal. The received modified challenge signal, or data indicative thereof and necessary for determining the channel impulse response is provided to a processor or signal processor in a step 406, which then, in a step 407 determines the channel impulse response to be pairwise associated to the challenge signal using the received modified challenge signal. Finally, the method includes, in a step 408 storing the determined channel impulse response in pairwise association with the respective challenge signal whose signal parameters were used to generate and provide the modified challenge signal, with respect to which the channel impulse response is determined. The method 400 can be performed repeatedly for generating, in a step 400a, a database of pairwise associations of different challenges and the corresponding channel impulse responses when the environment is in a state, regarded as the reference state, as it is shown in FIG. 5.

Figure 5:
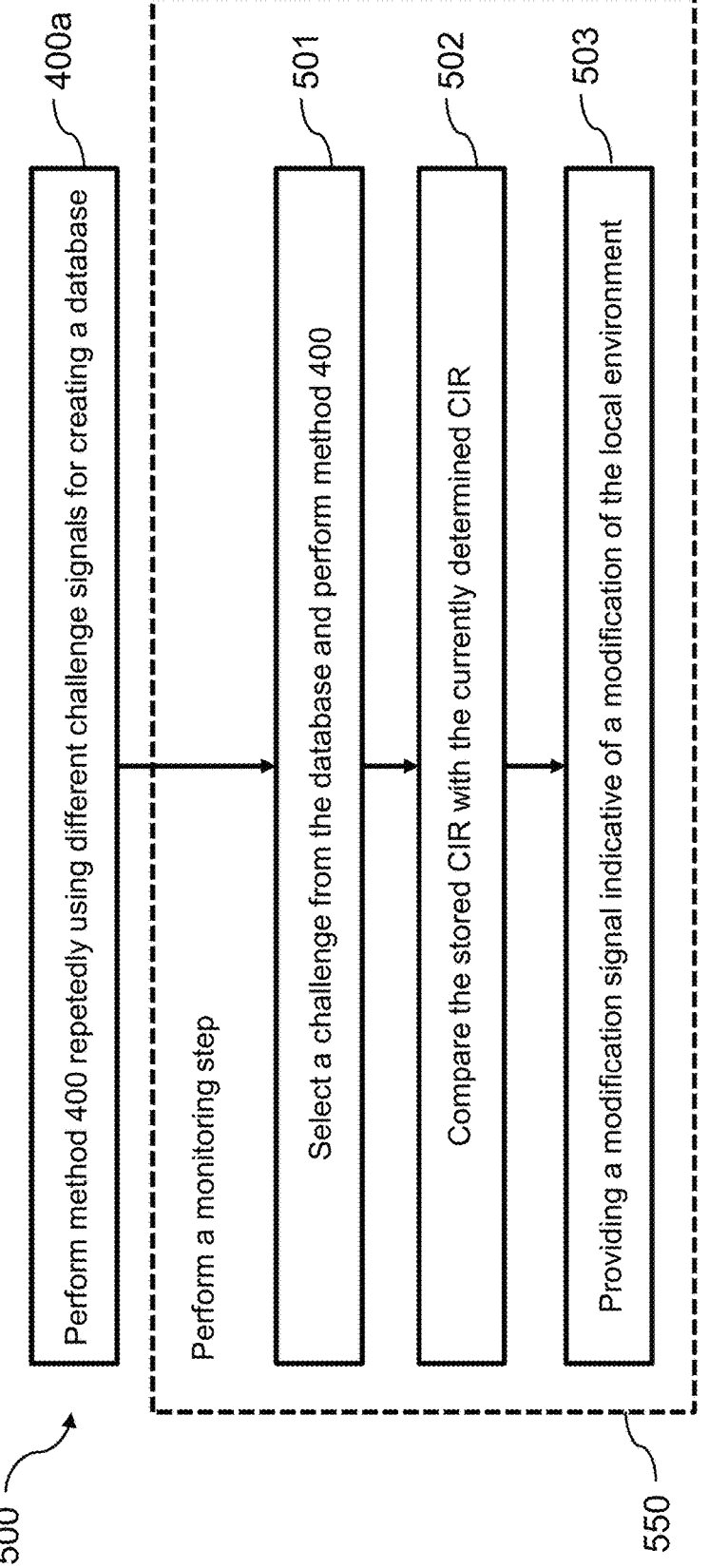
FIG. 5 shows a flow diagram of a method for monitoring a local environment.

FIG. 5 shows a flow diagram of a method 500 for monitoring a local environment. In addition to step 400a, where the method 400 is performed repeatedly for generating a database of pairwise associations, the method comprises, in a step 550 performing a monitoring step. In this monitoring step, the method comprises, selecting, in a step 501, a challenge from the database of available pairwise associations between challenge signals and channel impulse responses, and performing the steps of method 400, in particular steps 401 to 407, using said challenge for obtaining a channel impulse response determined from the modified challenge signal generated and provided in dependence on the challenge signal. The method further comprises, in a step 502 comparing the previously stored channel impulse response (e.g. obtained with the environment in the reference state) with the currently determined channel impulse response (e.g., obtained with the environment in the surveillance state) to detect any changes that might be indicative of a modification of the local environment between the reference state and the current surveillance state, both obtained using an identical challenge. The method further comprises in a step 503, and upon determining a deviation beyond a predetermined threshold amount between the stored channel impulse response and the currently determined channel impulse response, both associated to an identical challenge, providing a modification signal indicative of a modification of the local environment between the reference state and the surveillance state.

In summary, the invention is directed to a method for assessing a physical unclonable function using a response of a local environment to electromagnetic challenge signals. It comprises providing an electromagnetic challenge signal with a corresponding set of predetermined signal parameters to the local environment being in a reference state, in response to receiving the challenge signal and determining signal data of the received challenge signal, generating and transmitting a modified challenge signal with a respective set of modified signal parameters that depend on the signal data of the received challenge signal, determining the channel impulse response for the challenge signal using the received modified challenge signal; and storing the determined channel impulse response in pairwise association with the respective challenge signal, thereby increasing the unpredictability of the association between the challenge signal and the channel impulse response.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfil the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A method for assessing a physical unclonable function using a response of a local environment to electromagnetic challenge signals, the method comprising a transmitter providing, as a challenge, an electromagnetic challenge signal to the local environment, the challenge signal being provided with a corresponding set of predetermined signal parameters, and the local environment being in a reference state;

a transceiver, in response to receiving the challenge signal and determining signal data of the received challenge signal, generating and transmitting a modified challenge signal with a respective set of modified signal parameters that depend on the signal data of the received challenge signal;

a receiver receiving the modified challenge signal;

a signal processor determining, for association with the challenge signal, a channel impulse response using the received modified challenge signal; and the signal processor storing the determined channel impulse response in pairwise association with the respective challenge signal.

2. The method of claim 1, wherein the step of receiving the modified challenge signal includes receiving a direct line-of-sight component of the transmitted modified challenge signal and/or receiving a reflected component of the transmitted modified challenge signal.

3. The method of claim 1, wherein the signal parameters of the set of predetermined signal parameters according to which the challenge signals and the modified challenge signals are transmitted include one or more of a transmission power, a transmission frequency, a transmission direction, a directivity, a polarization and a phase, of the challenge signal.

4. The method of claim 1, wherein the channel impulse response is indicative of the electromagnetic field at the receiver, which is generated by at least the modified challenge signal.

5. The method of claim 1, wherein the step of providing challenges include transmitting two or more challenge signals simultaneously as a single challenge, and wherein the method comprises determining a single channel impulse response for the two or more challenge signals transmitted simultaneously.

6. The method of claim 5, comprising generating and transmitting the modified challenge signal with a respective set of modified signal parameters that further depend on the signal parameters of the two or more challenge signals provided simultaneously.

7. The method of claim 1, further comprising providing parameter data to the transceiver, the parameter data being indicative of the signal parameters of the set of predetermined signal parameters used for providing the challenge.

8. A method for monitoring unwanted changes to a local environment, the method comprising:

assessing a physical unclonable function using a response of the local environment to electromagnetic challenge signals by performing the method of claim 1; and performing a monitoring step, including:

selecting a set of predetermined signal parameters and the transmitter providing the corresponding challenge to the local environment, the local environment being in a surveillance state;

the transceiver, in response to receiving the challenge signal and determining the signal data of the received challenge signal, generating and transmitting the modified challenge signal with the respective set of modified signal parameters that depend on the signal data of the received challenge signal;

the receiver receiving the modified challenge signal;

the signal processor determining the channel impulse response for a given challenge signal using the received modified challenge signal; and the signal processor comparing the determined channel impulse response with that channel impulse response stored during the assessment of the physical unclonable function, and upon determining a deviation beyond a predetermined threshold amount between the stored channel impulse response and the currently determined channel impulse response, both associated to an identical challenge, providing a modification signal indicative of a modification of the local environment between the reference state and the surveillance state.

9. A local environment monitoring arrangement, comprising:

one or more transmitters configured to provide as a challenge, an electromagnetic challenge signal to the local environment, the challenge signal having a corresponding set of predetermined signal parameters, and the local environment being in a reference state or a surveillance state, which induces a channel impulse response to be determined for the given challenge signal;

one or more transceivers configured to, in response to a reception of the challenge signal, to determine signal data of the received challenge signal, and to generate and transmit a modified challenge signal with a respective set of modified signal parameters that depend on the signal data of the received challenge signal;

one or more receivers configured to receive the modified challenge signal;

a signal processor connected at least to the one or more transmitters and to the one or more receivers and configured:

to determine the channel impulse response for the challenge signal using the received modified challenge signal to store the determined channel impulse response in pairwise association with the respective challenge signal;

to compare a currently determined channel impulse response with that channel impulse response stored, both obtained using an identical challenge; and upon determining a deviation beyond a predetermined threshold amount between the stored channel impulse response and the currently determined channel impulse response, both associated to an identical challenge, to provide a modification signal indicative of a modification of the local environment between the reference state and the surveillance state.

10. The local environment monitoring arrangement of claim 9, wherein the one or more transmitters and/or the one or more receivers are transceivers, and wherein each of the transceivers is configured to act as any of a transmitter, a transceiver or a receiver for performing the steps of a method comprising:

providing, as a challenge, an electromagnetic challenge signal to the local environment, the challenge signal being provided with a corresponding set of predetermined signal parameters, and the local environment being in a reference state;

in response to receiving the challenge signal and determining signal data of the received challenge signal, generating and transmitting a modified challenge signal with a respective set of modified signal parameters that depend on the signal data of the received challenge signal; and receiving the modified challenge signal.

11. The local environment monitoring arrangement of claim 9, wherein the one or more transmitters and/or the one or more transceivers comprise an antenna array for providing the challenge signals and/or the modified challenge signals with a predetermined transmission direction and/or a predetermined directivity.

12. The local environment monitoring arrangement of claim 9, further including one or more passive reflectors having a structured reflective surface, the one or more passive reflectors arranged within the local environment for reflecting at least the modified challenge signal provided by the transceiver.

13. The local environment monitoring arrangement of claim 12, wherein an area of the one or more passive reflectors is larger than an impinge-area of the modified challenge signal on the one or more passive reflectors.

14. The local environment arrangement of claim 12, wherein each of the one or more passive reflectors has a structured reflective surface having a linear structure, a circular structure, or a helical structure.

15. A computer program comprising computer-executable instructions stored on a non-transitory computer-readable medium that, when executed by a processor of a local environment monitoring arrangement, cause the processor of the local environment monitoring arrangement to carry out a method for assessing a physical unclonable function using a response of a local environment to electromagnetic challenge signals, the method comprising:

a transmitter providing, as a challenge, an electromagnetic challenge signal to the local environment, the challenge signal being provided with a corresponding set of predetermined signal parameters, and the local environment being in a reference state;

a transceiver, in response to receiving the challenge signal and determining signal data of the received challenge signal, generating and transmitting a modified challenge signal with a respective set of modified signal parameters that depend on the signal data of the received challenge signal;

a receiver receiving the modified challenge signal;

a signal processor determining, for association with the challenge signal, a channel impulse response using the received modified challenge signal; and the signal processor storing the determined channel impulse response in pairwise association with the respective challenge signal.

* * * * *